United States Patent
Tsujii

(10) Patent No.: US 12,061,921 B2
(45) Date of Patent: Aug. 13, 2024

(54) MANAGEMENT APPARATUS, MANAGEMENT SYSTEM, MANAGEMENT METHOD AND MANAGEMENT PROGRAM

(71) Applicant: NEC Corporation, Tokyo (JP)

(72) Inventor: Takahiro Tsujii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 888 days.

(21) Appl. No.: 16/977,233

(22) PCT Filed: Mar. 19, 2019

(86) PCT No.: PCT/JP2019/011587
§ 371 (c)(1),
(2) Date: Sep. 1, 2020

(87) PCT Pub. No.: WO2019/181980
PCT Pub. Date: Sep. 26, 2019

(65) Prior Publication Data
US 2021/0064411 A1 Mar. 4, 2021

(30) Foreign Application Priority Data
Mar. 20, 2018 (JP) .................. 2018-052788

(51) Int. Cl.
G06F 9/455 (2018.01)
(52) U.S. Cl.
CPC .......... *G06F 9/45558* (2013.01); *G06F 2009/45562* (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| 10,614,095 B2 * | 4/2020 | Gilligan ................. H04L 43/08 |
| 2016/0266924 A1 | 9/2016 | Iyobe |

FOREIGN PATENT DOCUMENTS

| JP | 2015-146175 A | 8/2015 |
| JP | 2016-057851 A | 4/2016 |
| JP | 2016-092821 A | 5/2016 |
| JP | 2016-167124 A | 9/2016 |
| JP | 2016-181091 A | 10/2016 |
| JP | 2017-201492 A | 11/2017 |

OTHER PUBLICATIONS

International Search Report for PCT Application No. PCT/JP2019/011587, mailed on Jun. 11, 2019.

* cited by examiner

*Primary Examiner* — Charlie Sun

(57) ABSTRACT

Virtual machine configuration information and physical machine IDs are collected from physical machines in association with each other. In addition, among information stored in a management table which stores them, a physical machine ID corresponding to the collected virtual machine configuration information, and it is determined whether or not the detected physical machine ID matches with the collected physical machine ID. Herein, in a case of determining not-matching, a physical machine of a source of the collected information is requested to change the virtual machine configuration information.

20 Claims, 12 Drawing Sheets

FIG. 4

| VIRTUAL MACHINE CONFIGURATION INFORMATION | PHYSICAL MACHINE ID |
|---|---|
| AAA | XXX |
| BBB | XXX |
| CCC | XXX |

FIG. 7

| PHYSICAL MACHINE ID | VIRTUAL MACHINE CONFIGURATION INFORMATION |
|---|---|
| XXX | AAA |

FIG. 10

| VIRTUAL MACHINE CONFIGURATION INFORMATION | PHYSICAL MACHINE ID | VIRTUAL MACHINE INFORMATION |
|---|---|---|
| AAA | XXX | 1 |
| BBB | XXX | 2 |
| CCC | XXX | 3 |
| AAA | XXX | 4 |

FIG. 11

| PHYSICAL MACHINE ID | VIRTUAL MACHINE CONFIGURATION INFORMATION | VIRTUAL MACHINE INFORMATION |
|---|---|---|
| XXX | AAA | 1 |

# MANAGEMENT APPARATUS, MANAGEMENT SYSTEM, MANAGEMENT METHOD AND MANAGEMENT PROGRAM

CROSS-REFERENCE TO RELATED APPLICATION

This application is a National Stage Entry of PCT/JP2019/011587 filed on Mar. 19, 2019, which claims priority from Japanese Patent Application 2018-052788 filed on Mar. 20, 2018, the contents of all of which are incorporated herein by reference, in their entirety.

The present invention relates to a management apparatus, a management system, a management method and a management program, particularly, a management apparatus, a management system, a management method and a management program for managing virtual machines.

BACKGROUND

Field

There are technologies for managing a plurality of virtual machines operating on a physical machine(s). For example, in Patent Literature 1, an identification information based on inner time (system time) of a management apparatus is assigned to each of virtual machines, and the management apparatus identifies the virtual machines based on the identification information.

Patent Literature 1: JP 2016-167124 A

SUMMARY

The following analyses have been made according to the view of the present invention. The disclosure of the above prior art literature is to be incorporated herein by reference.

If a virtual machine is cloned (replicated), multiple virtual machines having the same identification information would be present, resulting in that there may be a case where a management apparatus cannot identify each virtual machine. For example, in the technology of Patent Literature 1, each virtual machine stores identification information assigned by a management apparatus, thus there is a case where the stored identification information is also copied upon cloning. In such case, the original (cloning source) virtual machine for cloning and a cloned (replicated, i.e., cloning result) virtual machine would have the same identification information. In other words, a duplicate identification information would be present.

In Patent Literature 1, duplication of the identification information is resolved by assigning an identification information different from that of the original virtual machine to the cloned (replicated) virtual machine when MAC address (Media Access Control address) of the cloned virtual machine is changed. However, under such configuration, if an event for changing MAC address does not occur in the virtual machine, duplication of the identification information would not be detected.

Therefore, it is a purpose of the present invention to provide a technology for eliminating duplication of identification information between the virtual machines.

According to a first aspect of the present invention, there is provided a management apparatus, comprising:

a management table that stores virtual machine configuration information indicating configuration of virtual machines, and, in association therewith, physical machine ID(s) for identifying physical machines operating the virtual machine(s);

a configuration information collection part that collects, from the physical machines, the virtual machine configuration information of the virtual machines which are operated by the physical machine(s) and, in association therewith, the physical machine ID(s) of the physical machine(s);

a determination part that detects a physical machine ID corresponding to the virtual machine configuration information collected by the configuration information collection part among information stored in the management table, and determines whether or not the detected physical machine ID matches with the physical machine ID collected by the configuration information collection part; and a change request part that, in a case where it is determined as not matching by the determination part, requests the physical machine of a source of the information collected by the configuration information collection part to change the virtual machine configuration information.

According to a second aspect of the present invention, there is provided a management system, comprising physical machines operating virtual machines and a management apparatus managing the virtual machines, wherein the management apparatus comprises:

a management table that stores virtual machine configuration information indicating configuration of virtual machine(s), and, in association therewith, physical machine ID(s) for identifying physical machine(s) operating the virtual machine(s);

a configuration information collection part that collects, from the physical machines, the virtual machine configuration information of the virtual machine(s) which is (are) operated by the physical machine(s) and, in association therewith, the physical machine ID(s) of the physical machine(s);

a determination part that detects a physical machine ID corresponding to the virtual machine configuration information collected by the configuration information collection part among information stored in the management table, and determines whether or not the detected physical machine ID matches with the physical machine ID collected by the configuration information collection part; and a change request part that, in a case where it is determined as not matching by the determination part, requests the physical machine of a source of the information collected by the configuration information collection part to change the virtual machine configuration information.

According to a third aspect of the present invention, there is provided a management method, comprising:

a configuration information collection step of collecting virtual machine configuration information of virtual machines which are operated by physical machine(s) and, in association therewith, physical machine ID(s) of the physical machine(s), from the physical machines;

a determination step of detecting, among information stored in a management table that stores the virtual machine configuration information indicating configuration of the virtual machine(s) and, in association therewith, the physical machine ID(s) for identifying the physical machines operating the virtual machine(s), a physical machine ID corresponding to the virtual machine configuration information collected in the configuration information collection step, and determining whether or not the detected physical machine ID matches with the physical machine ID(s) collected in the configuration information collection step; and a change request step of requesting, in a case where it is determined as not matching in the determination step, the physical machine of a source of the information collected in the configuration information collection step, to change the virtual machine configuration information.

According to a fourth aspect of the present invention, there is provided a management program, causing a computer to execute:

a configuration information collection process of collecting virtual machine configuration information of virtual machines which are operated by physical machine(s) and, in association therewith, physical machine ID(s) of the physical machine(s), from the physical machine(s);

a determination process of detecting, among information stored in a management table that stores the virtual machine configuration information indicating configuration of the virtual machine(s) and, in association therewith, the physical machine ID(s) for identifying the physical machine(s) operating the virtual machine(s), a physical machine ID corresponding to the virtual machine configuration information collected in the configuration information collection process, and determining whether or not the detected physical machine ID matches with the physical machine ID(s) collected in the configuration information collection process; and a change request process of requesting, in a case where it is determined as not matching in the determination process, the physical machine of a source of the information collected in the configuration information collection process, to change the virtual machine configuration information.

According to each of aspects of the present invention, there are provided a management apparatus, a management system, a management method and a management program for eliminating duplication of identification information of virtual machines.

BRIEF DESCRIPTION OF THE DRAWINGS

FIG. 4 is a diagram showing an example of information stored in a management table 111.

FIG. 7 is a diagram showing an example of information stored in a configuration table 331.

FIG. 10 is a diagram showing an example of information stored in the management table 111.

FIG. 11 is a diagram showing an example of information stored in the configuration table 331.

PREFERRED MODES

Preferable exemplary embodiments of the present invention will be explained in detail while referring to drawings. Herein, reference signs in the following description are expediently attached to each element as an explanatory aid for understanding, but not for limitation of the present invention to an illustrated configuration. Further, connection lines between blocks in each figure include both of bidirectional connection and one directional connection.

Figure 1:
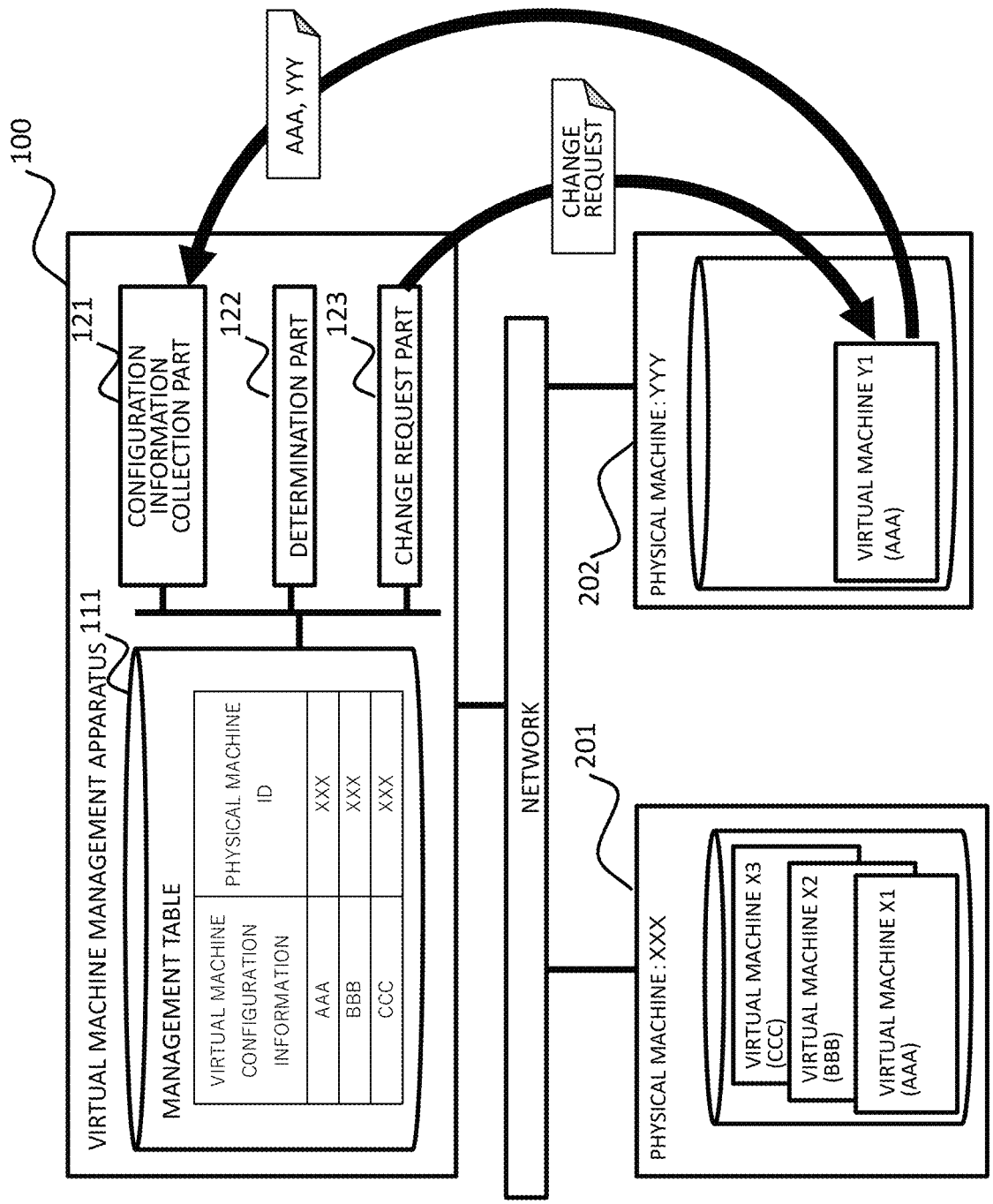
FIG. 1 is an explanatory view of an outline of the present invention.

In one exemplary embodiment of the present invention, as illustrated in FIG. 1, a virtual machine management apparatus 100 is connected to physical machines 201, 202 via a network. Three virtual machines X1 to X3 operate on the physical machine 201. Virtual machine configuration information: AAA, BBB, CCC are assigned to the virtual machines X1 to X3. The virtual machine configuration information is information indicating configurations of the virtual machines, for example IP address (Internet Protocol address), MAC address (Media Access Control address), virtual machine name, and the like. In addition, the virtual machine configuration information also corresponds to the "identification information".

Further, a virtual machine Y1 operates (acts) on the physical machine 202, which has been cloned (replicated) from the physical machine 201. In a case where a virtual machine is cloned, the virtual machine configuration information is also copied, thus the virtual machine Y1 on the physical machine 202 has the same virtual machine configuration information as that of the virtual machine X1 on the physical machine 201 (i.e., virtual machine configuration information: AAA).

Under such state, the virtual machine management apparatus 100 of the present invention is directed to a purpose of eliminating duplication of the virtual machine configuration information. That is, the virtual machine management apparatus 100 comprises a management table 111, a configuration information collection part 121, a determination part 122 and a change request part 123.

The management table 111 stores the virtual machine configuration information indicating configuration of the virtual machines and physical machine ID (identifier) for identifying the virtual machine operating (acting) the physical machines in association with each other. In the example illustrated in FIG. 1, the management table 111 stores the virtual machine configuration information (AAA, BBB, CCC) of the virtual machines X1 to X3 acting on the physical machine 201 and, in association with the virtual machine configuration information, the physical machine ID (XXX) of the physical machine 201.

The configuration information collection part 121 collects, from the physical machines, the virtual machine configuration information of the virtual machine operated by the physical machines and the physical machine IDs of the physical machines. In the example illustrated in FIG. 1, the configuration information collection part 121 collects the virtual machine configuration information: AAA of a virtual machine Y1 and a physical machine ID: YYY of the physical machine 202 from the physical machine 202.

The determination part 122 detects a physical machine ID corresponding to the virtual machine configuration information collected by the configuration information collection part 121 among the information stored in the management table 111. In addition, the determination part 122 determines whether or not the detected physical machine ID matches with the physical machine ID collected by the configuration information collection part 121. In the example illustrated in FIG. 1, the determination part 122 detects a physical machine ID corresponding to the virtual machine configuration information of the virtual machine Y1 in the management table 111 (i.e., XXX corresponding to AAA). In addition, the determination part 122 determines that the detected physical machine ID: XXX does not match with the collected physical machine ID: YYY.

In a case where the determination part 122 determines as not matching, the change request part 123 requests the physical machine of the source of the information collected by the configuration information collection part 121 to change the virtual machine configuration information. In the example illustrated in FIG. 1, the change request part 123 requests the physical machine 202 to change the virtual machine configuration information.

The physical machine 202 which has received the request for changing the virtual machine configuration information from the virtual machine management apparatus 100 changes the virtual machine configuration information of the virtual machine Y1 to, for example, DDD.

As stated above, according to the virtual machine management apparatus 100 of the present invention, duplication of the virtual machine configuration information is eliminated (resolved).

Preferable exemplary embodiments of the present invention will be explained in detail while referring to drawings.

First Exemplary Embodiment

Figure 2:
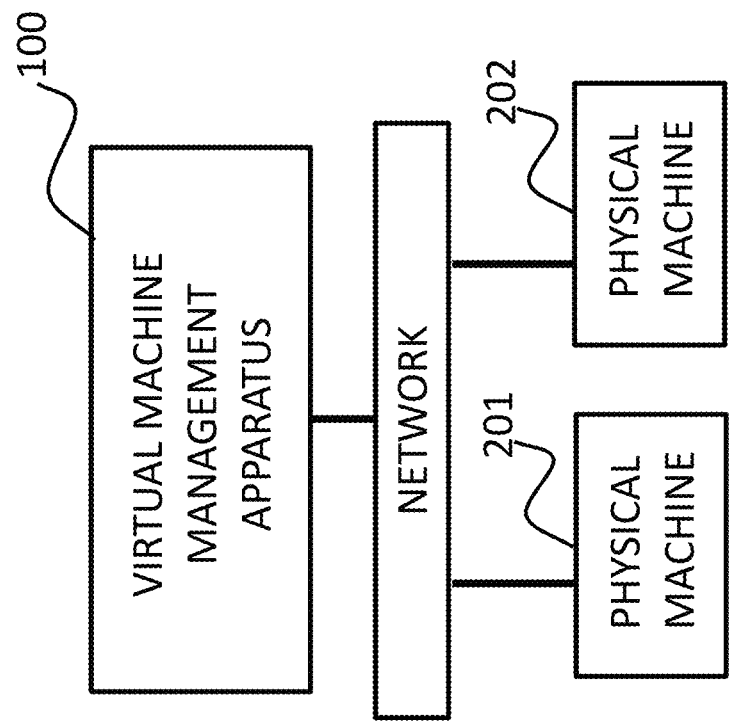
FIG. 2 is a diagram showing an example of network configuration of a first exemplary embodiment.

As illustrated in FIG. 2, the virtual machine management apparatus 100 is connected to the physical machines 201, 202 via the network.

Figure 3:
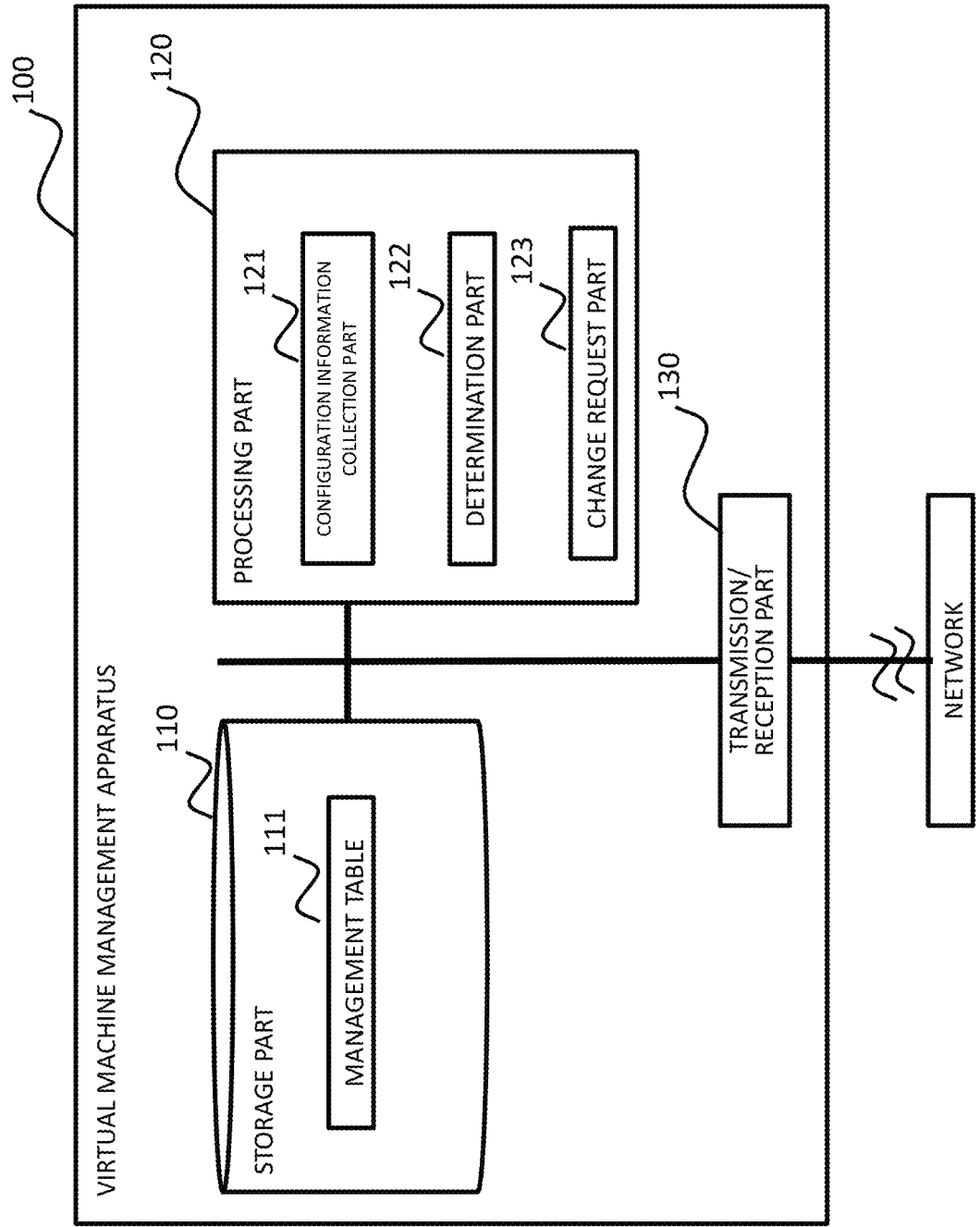
FIG. 3 is a diagram showing an exemplary configuration of a virtual machine management apparatus 100.

As illustrated in FIG. 3, the virtual machine management apparatus 100 comprises a storage part 110, a processing part 120 and transmission/reception part 130. The storage part 110, the processing part 120 and the transmission/reception part 130 are connected via a bus and the like. Note, the sign "/" denotes "and" in the present disclosure.

The storage part 110 comprises a ROM (read only memory), a RAM (random access memory), a cache memory, etc. for storing program for entirely controlling the virtual machine management apparatus 100, particularly, comprising a management table 111 for managing the virtual machines. As illustrated in FIG. 4, the management table 111 stores virtual machine configuration information: AAA, BBB, CCC indicating configuration of the virtual machines and physical machine ID: XXX for identifying the physical machines operating the virtual machines in association with each other. Herein, the information stored in the management table 111 is stored and updated by a determination part 122 as described later on.

The virtual machine configuration information is, for example, IP address, thus in a case where a virtual machine is cloned, the virtual machine configuration information is also copied. In addition, the physical machine ID is apparatus identification ID assigned to the physical machines 201, 202 when they are manufactured. Hereinafter, there is a case where a combination of the virtual machine configuration information and the physical machine ID is referred to as "management information". Further, there is a case where a framework of the combination of one virtual machine configuration information and one physical machine ID in the management table 111 is referred to as "entry".

A processing part 120 is configured by comprising a CPU (Central Processing Unit) or a chip, particularly comprising a configuration information collection part 121, a determination part 122 and a change request part 123. The configuration information collection part 121 periodically collects from each of the physical machines 201, 202 virtual machine configuration information of the virtual machines operated thereon and the physical machine IDs of the physical machines 201, 202.

The determination part 122 searches an entry including the virtual machine configuration information collected by the configuration information collection part 121 among information stored in the management table 111. In a case where the entry including the collected virtual machine configuration information is absent in the management table 111, the determination part 122 creates a new entry in the management table 111 and stores the collected virtual machine configuration information and the physical machine ID in association with each other. On the other hand, in a case where the entry is present, the determination part 122 determines whether or not the detected physical machine ID matches with the physical machine ID collected by the configuration information collection part 121. In a case where it is determined that the detected physical machine ID matches with the physical machine ID collected by the configuration information collection part 121, the determination part 122 discards the collected virtual machine configuration information and the physical machine ID.

In a case where it is determined as not-matching by the determination part 122, the change request part 123 requests the physical machines 201, 202 of the source of the information collected by the configuration information collection part 12 to change the virtual machine configuration information.

The transmission/reception part 130 is an interface for communication with other apparatuses, particularly, the physical machines 201, 202 via the network.

The physical machines 201, 202 are nodes for operating and managing the virtual machines (for example, PC (personal computer)), which have the same or similar configuration. Therefore, the physical machine 201 will be explained below while assuming that the physical machine 202 has the same configuration as that of the physical machine 201. Herein, the number of the physical machines 201, 202 is not limited to two.

Figure 5:
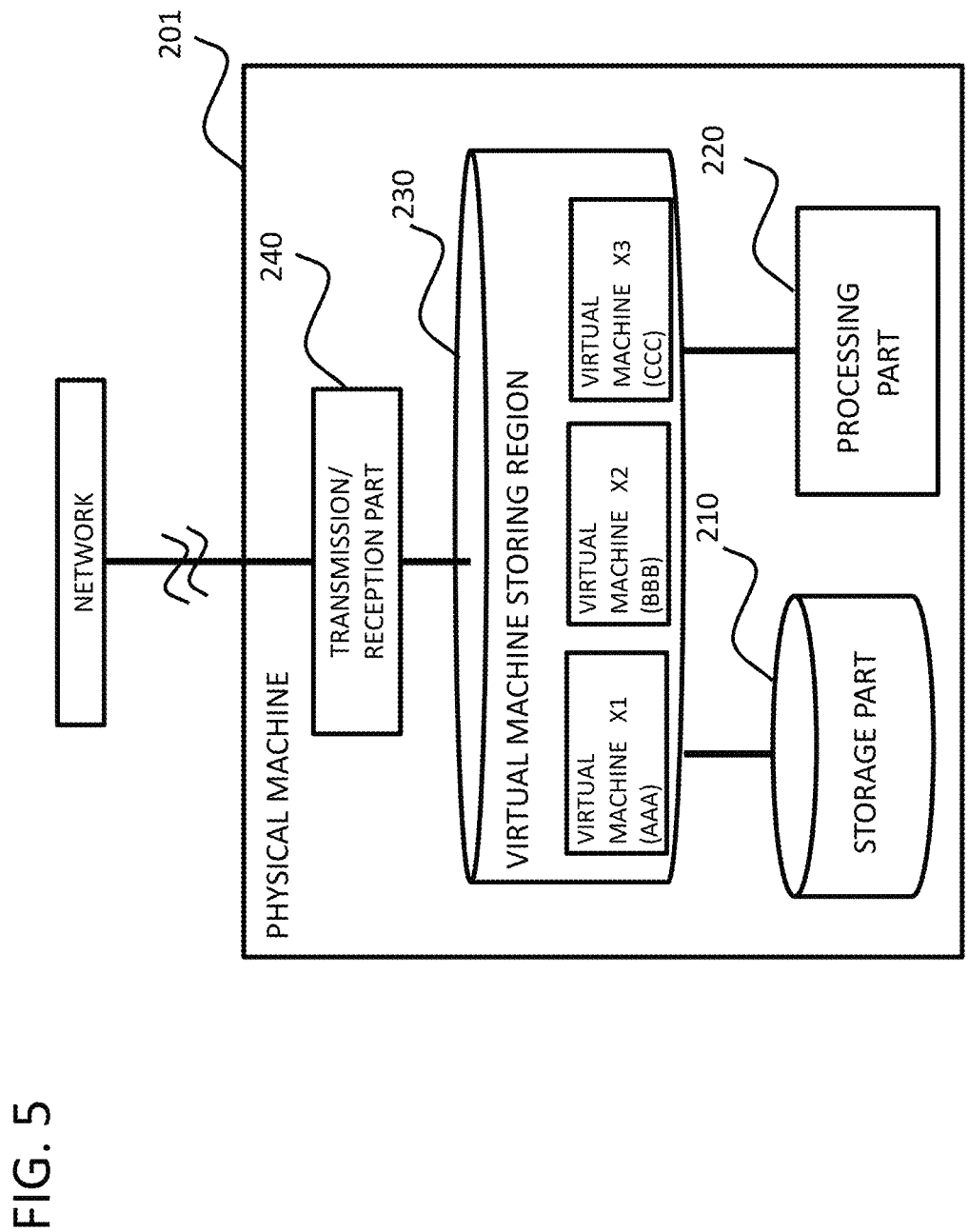
FIG. 5 is a diagram showing an exemplary configuration of a physical machine 201.

Concretely, as illustrated in FIG. 5, the physical machine 201 comprises: a storage part 210, such as HDD (hard disk drive); a processing part 220 such as CPU; a virtual machine storing region 230; and a transmission/reception part 240 as a communication interface with the other apparatuses. It is assumed that the virtual machines X1 to X3 operate on the physical machine 201, which execute process using resources of HDD and CPU respectively allocated thereto. The virtual machines X1 to X3 are stored in the virtual machine storing region 230 of the physical machine 201.

The virtual machines X1 to X3 are realized by software, but not having a physical configuration. However, as illustrated in, for example, FIG. 6, the virtual machines X1 to X3 are conceptually described as having a configuration including HDD 310, CPU 320, a processing part 330, and a transmission/reception part 340. Herein, a configuration of the virtual machine X1 will be explained below while assuming that the virtual machines X2, X3 have the same or similar configuration as that of the virtual machine X1.

The processing part 330 comprises a configuration table 331, a configuration information response part 332 and a configuration information changing part 332 and executes processes for eliminating duplication of the configuration information. The configuration table 331 stores virtual machine configuration information of the virtual machine X1. Concretely, as illustrated in FIG. 7, the configuration table 331 stores physical machine ID: XXX and virtual machine configuration information: AAA of the physical machine 201 in association with each other.

In a case where transmission of the management information is requested by the virtual machine management apparatus 100, the configuration information response part 332 makes reference to the configuration table 331 and returns the virtual machine configuration information and the physical machine ID thereto. In a case where change of the virtual machine configuration information is requested by the virtual machine management apparatus 100, the configuration information changing part 333 changes the virtual machine configuration information stored in the configuration table 331. Concretely, in a case where the request for changing the virtual machine configuration information has been received from the virtual machine management apparatus 100, the configuration information changing part 333 changes it by generating new virtual machine configuration information, for example, an ID generated randomly.

Figure 8:
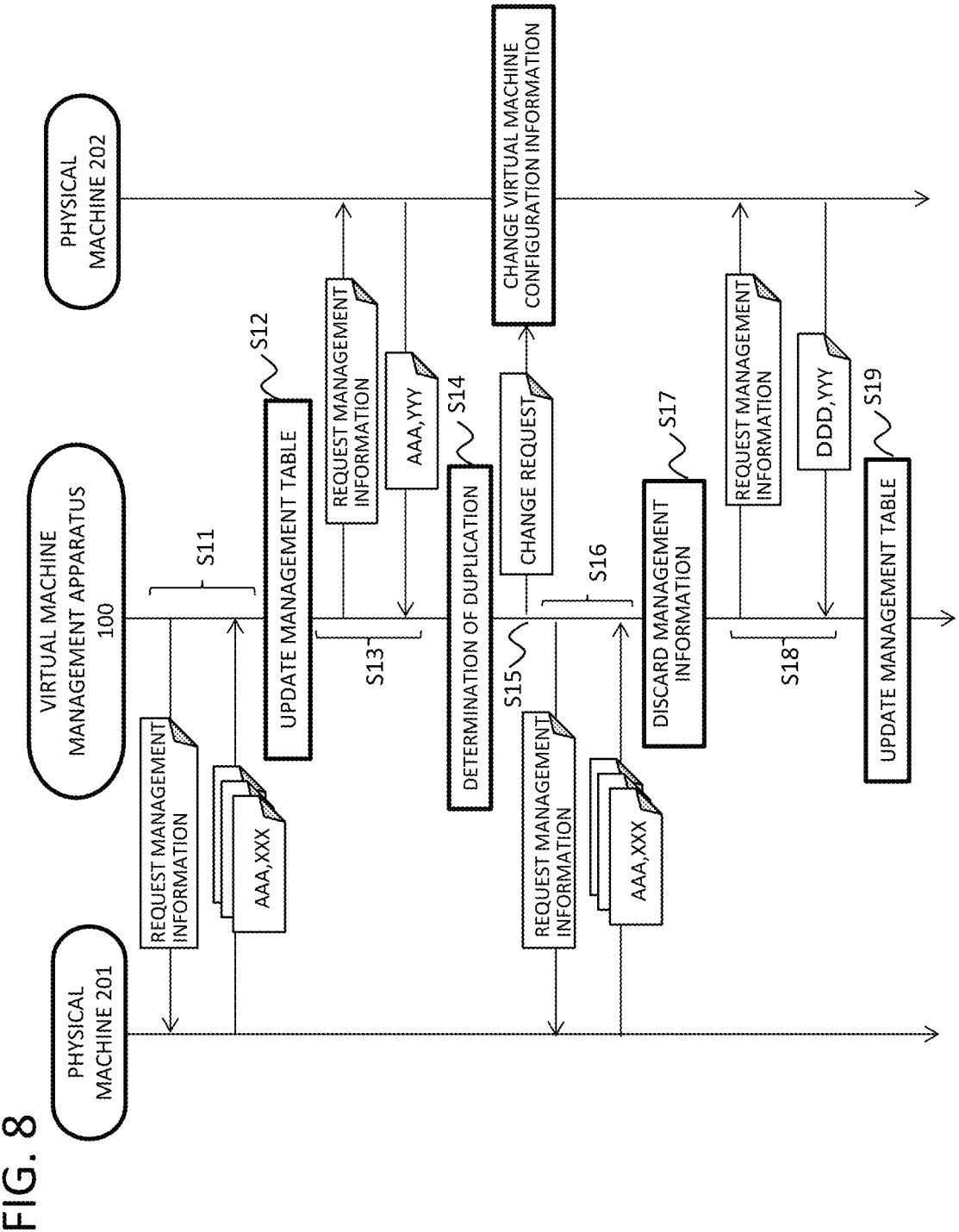
FIG. 8 is a flowchart showing an example of flow of sequential processes executed between the virtual machine management apparatus 100 and the physical machines 201, 202.

In the description below, flows of processes executed by the virtual machine management apparatus 100 and the physical machines 201, 202 will be explained. First, referring to FIG. 8, a concrete example of a sequential flow of processes executed between the virtual machine management apparatus 100 and the physical machines 201, 202 will be explained. Herein, it is assumed likewise FIG. 1 that the virtual machines X1 to X3 operate on the physical machine 201 and the virtual machine Y1 as a clone of the virtual machine X1 operates on the physical machine 202.

The management table 111 is in a state having no entry under a state where the virtual machine management apparatus 100 is at an initial state. From such state, first, the configuration information collection part 121 requests the physical machine 201 to transmit the management information to collect it (step S11). Concretely, the configuration information collection part 121 requests the configuration information response parts 332 of the virtual machines X1 to 3 to transmit the management information. Herein, it is assumed that virtual machine configuration information: AAA, BBB, CCC and physical machine ID: XXX are collected from the physical machine 201.

The determination part 122 searches for an entry including the virtual machine configuration information: AAA from the management table 111, but it cannot detect it. Thus, the determination part 122 creates a new entry in the management table 111 and stores the virtual machine configuration information: AAA and the physical machine ID: XXX therein. In other words, the determination part 122 updates the management table 111 (step S12). Similarly, the determination part 122 creates entries for the virtual machine configuration information: BBB and CCC. In other words, the determination part 122 determines that the virtual machines having the virtual machine configuration information: AAA, BBB, CCC are new virtual machines. At that time, the management table 111 has a state illustrated in FIG. 4.

After elapse of a given time period from collection of the management information from the physical machine 201, next, the configuration information collection part 121 requests the physical machine 202 to transmit the management information to collect it (step S13). Herein, it is assumed that virtual machine configuration information: AAA and physical machine ID: YYY are collected from the physical machine 202.

The determination part 122 searches for an entry including the virtual machine configuration information: AAA from the management table 111, and resulting in success in detection of the physical machine ID: XXX corresponding to the virtual machine configuration information: AAA. Then, the determination part 122 compares the detected physical machine ID: XXX with the collected physical machine ID: YYY, resulting in that they are determined as not-matching. In other words, the determination part 122 determines duplication of the virtual machine configuration information: AAA (step S14).

Then, the change request part 123 requests the physical machine 202 of a source of the collected information to change the virtual machine configuration information. The physical machine 202 changes the virtual machine configuration information as a response to the request from the virtual machine management apparatus 100 (step S15). Concretely, the change request part 123 requests the configuration information changing part 333 of the virtual machine Y1 to change the virtual machine configuration information. In other words, the configuration information changing part 333 changes the virtual machine configuration information so as to eliminate duplication of it.

Then, after elapse of a given time period from collection of the management information from the physical machine 202, the configuration information collection part 121 requests the physical machine 201 to transmit the management information again to collect it (step S16). Herein, it is also assumed that virtual machine configuration information: AAA, BBB, CCC and physical machine ID: XXX are collected from the physical machine 201, likewise step S11.

The determination part 122 searches for an entry including the virtual machine configuration information: AAA from the management table 111, resulting in success in detection of the physical machine ID: XXX corresponding to the virtual machine configuration information: AAA. Herein, the determination part 122 determines that the detected physical machine ID: XXX matches with the collected physical machine ID: XXX, and thus discards the management information associated with the virtual machine configuration information: AAA. Similarly, the determination part 122 also discards the management information associated with the virtual machine configuration information: BBB and CCC (step S17). In other words, the determination part 122 determines that the virtual machines having the virtual machine configuration information: AAA, BBB, CCC are of pre-existing.

Then, after elapse of a given time period, the configuration information collection part 121 requests the physical machine 202 to transmit the management information to collect it (step S18). Herein, the virtual machine configuration information: DDD and the physical machine ID: YYY, which are after change, are collected.

The determination part 122 searches for an entry including the virtual machine configuration information: DDD from the management table 111, but it cannot detect it. Thus, the determination part 122 creates a new entry in the management table 111 and store the virtual machine configuration information: DDD and the physical machine ID: YYY therein. In other words, the determination part 122 updates the management table 111 (step S19).

As described above, duplication of the virtual machine configuration information is detected in step S14 and then the duplication of the virtual machine configuration information is eliminated in step S15.

Figure 9:
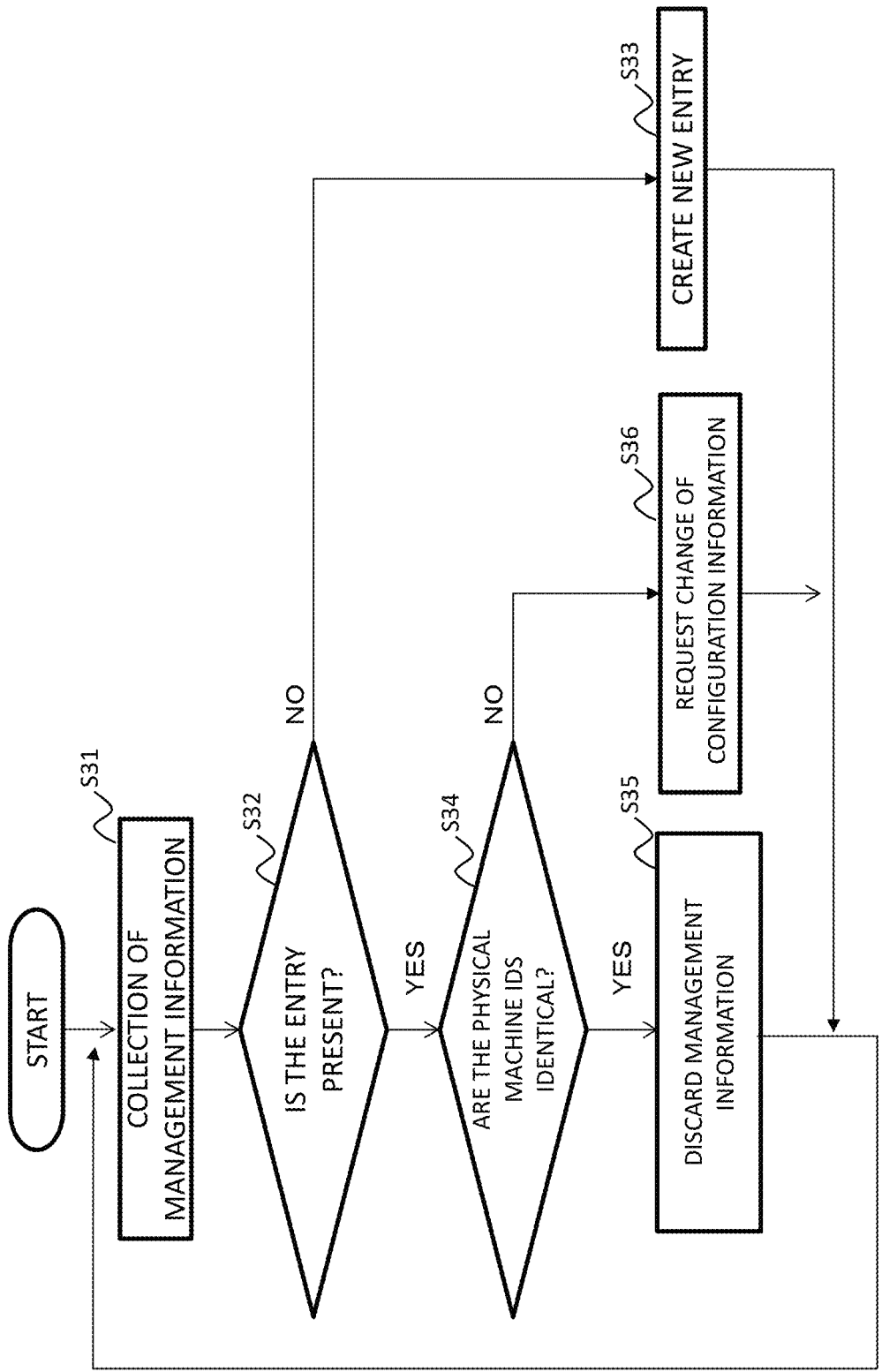
FIG. 9 is a flowchart showing an example of flow of processes executed by the virtual machine management apparatus 100.

Next, referring to FIG. 9, a flow of processes executed in the virtual machine management apparatus 100 will be concretely explained. The configuration information collection part 121 periodically collects, from the physical machines 201, 202, the virtual machine configuration information of the virtual machines which operate on each of them and the physical machine IDs of the physical machines 201, 202, i.e., the management information (step S31). The determination part 122 searches for an entry including the collected virtual machine configuration information (step S32). Herein, in a case where the entry is absent (step S32, NO), the determination part 122 creates a new entry and stores the virtual machine configuration information and the physical machine ID therein (step S33).

On the other hand, in a case where the entry is present (step S32, YES), the determination part 122 determines whether or not the detected physical machine ID matches with the collected physical machine ID (step S34). Herein, it is determined that the physical machine IDs matches each other (i.e., are identical) (step S34, YES), the determination part 122 discards the collected virtual machine configuration information and physical machine ID, i.e., the management information (step S35).

On the other hand, in a case where it is determined that the physical machine IDs do not match each other (i.e., are not identical) (step S34, NO), the change request part 123 requests the physical machines 201, 202 of a source of the collected information to change the virtual machine configuration information (step S36). Herein, after steps S33, S35, S36, the virtual machine management apparatus 100 returns to step S31 and the configuration information collection part 121 collects the management information again.

As described above, according to the first exemplary embodiment, in a case where duplicate virtual machine configuration information is present due to cloning of the virtual machine, such duplication of the identification information of the virtual machines can be eliminated. Particularly, according to the first exemplary embodiment, even under a state where change of MAC address has not been executed in the virtual machine of a source for cloning, duplication of the virtual machine configuration information can be eliminated.

Second Exemplary Embodiment

In the first exemplary embodiment, explained is a case where the virtual machine X1 of the physical machine 201 is cloned as the virtual machine Y1 of the physical machine 202. However, there may be a case where the virtual machine X1 of the physical machine 201 is cloned as a virtual machine X4 of the physical machine 201. In such a case, the virtual machine X1 and the virtual machine X4 cannot be distinguished from one another using the physical machine ID of the physical machine 201. Therefore, in the second exemplary embodiment, it is explained a case where duplication of virtual machine configuration information of the virtual machines X1, X4 on the same physical machine 201 is eliminated.

The virtual machine management apparatus 100 has a configuration illustrated in FIG. 3 similarly to that of the first exemplary embodiment, with a proviso that the management table 111 stores the virtual machine configuration information, the physical machine ID, and virtual machine information in association with each other as illustrated in FIG. 10. The virtual machine information is information managed by the physical machine 201 for identifying the virtual machines X1 to X4, for example, information assigned when the virtual machines are created. As a concrete example, the virtual machine information is exemplified by a virtual machine number sequentially assigned to the virtual machine, date and time at which the virtual machines have been created, or a random number generated when the virtual machines have been created. Herein, the virtual machine information is information for identification of each virtual machine by the physical machine 201, thus having different property from the virtual machine configuration information for identification of each virtual machine by the virtual machine management apparatus 100. For example, under a situation illustrated in FIG. 1, in a case where the virtual machine X1 and the virtual machine Y1 have a common virtual machine number: 1, the virtual machine management apparatus 100 cannot identify these virtual machines based on their virtual machine numbers. However, the virtual machine configuration information of the virtual machine X1 is AAA, and the configuration information of the virtual machine Y1 is to be changed from AAA to DDD, thus the virtual machine management apparatus 100 can identify each virtual machine using the virtual machine configuration information.

The configuration information collection part 121 periodically collects the virtual machine configuration information, the physical machine ID, and the virtual machine information from the physical machine 201. For example, the configuration information collection part 121 collects virtual machine configuration information: AAA, BBB, CCC, physical machine ID: XXX, and virtual machine information 1 to 4 from the physical machine 201.

The determination part 122 determines whether or not multiple virtual machine information corresponding to the same virtual machine configuration information is present in the information stored in management table 111. Concretely, the determination part 122 searches for entries including virtual machine configuration information: AAA from the management table 111. Herein, in a case where a plurality of entries are detected, the determination part 122 determines that multiple of virtual machine information corresponding to the same virtual machine configuration information is present.

In a case where the determination part 122 determines that multiple of virtual machine information corresponding to the same virtual machine configuration information is present, the change request part 123 requests the physical machine 201 to change the virtual machine configuration information. Concretely, the change request part 123 requests the configuration information changing parts 333 of the virtual machines X1, X4, which have the virtual machine configuration information detected by the determination part 122, to change the virtual machine configuration information.

Figure 6:
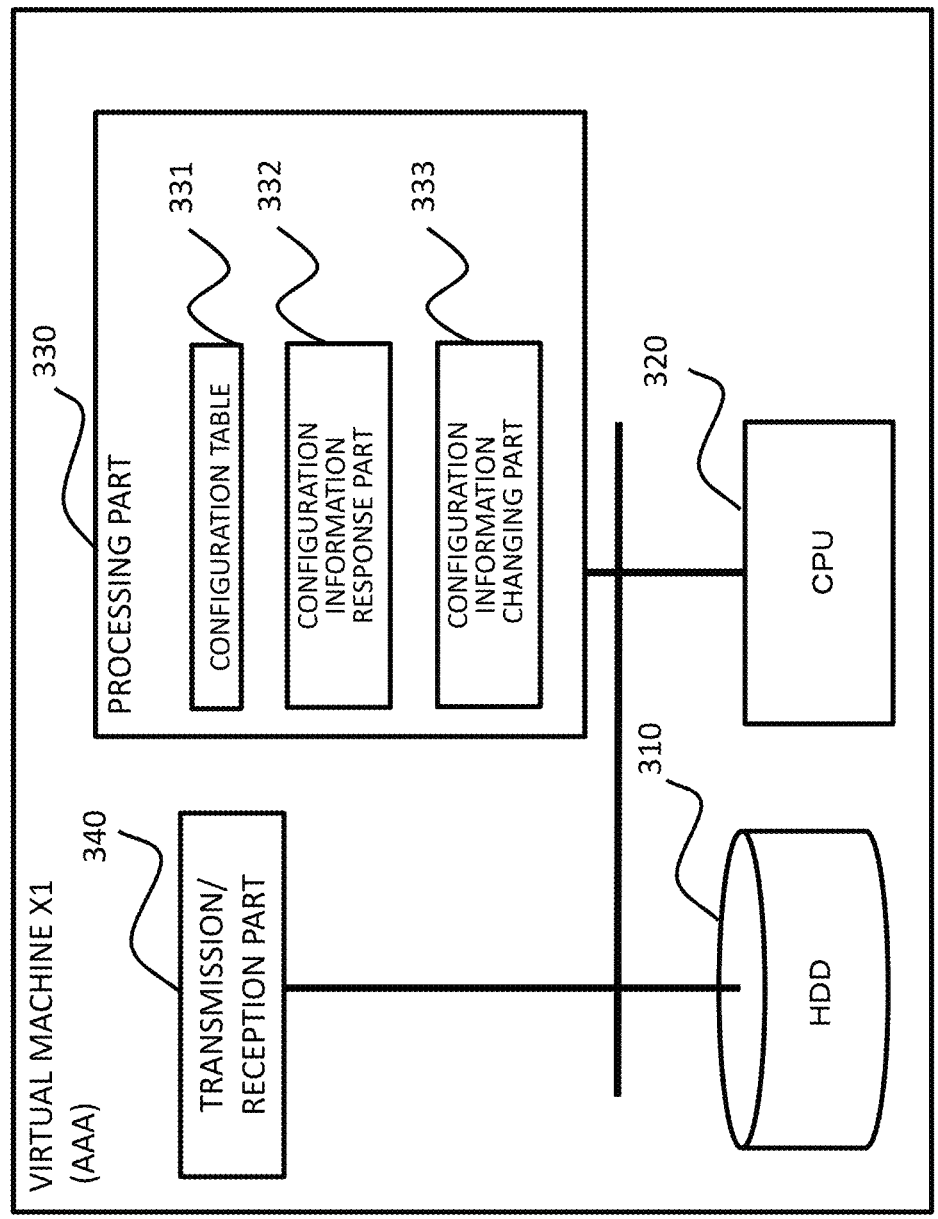
FIG. 6 is a diagram showing an exemplary configuration of a virtual machine X1.

The physical machine 201 has a configuration illustrated in FIG. 5 similarly to that of the first exemplary embodiment, and the virtual machines X1 to X4 have a configuration illustrated in FIG. 6 with a proviso that the management table 111 stores the physical machine ID, the virtual machine configuration information, and the virtual machine information in association with each other as illustrated in FIG. 10. In a case where the configuration information response part 332 is requested to transmit the management information by the virtual machine management apparatus 100, the configuration information response part 332 makes reference to the configuration table 331 and returns the virtual machine configuration information, the physical machine ID and the virtual machine information. In a case where the configuration information changing part 333 is requested to change the virtual machine configuration information by the virtual machine management apparatus 100, the configuration information changing part 333 changes the virtual machine configuration information stored in the configuration table 331.

Figure 12:
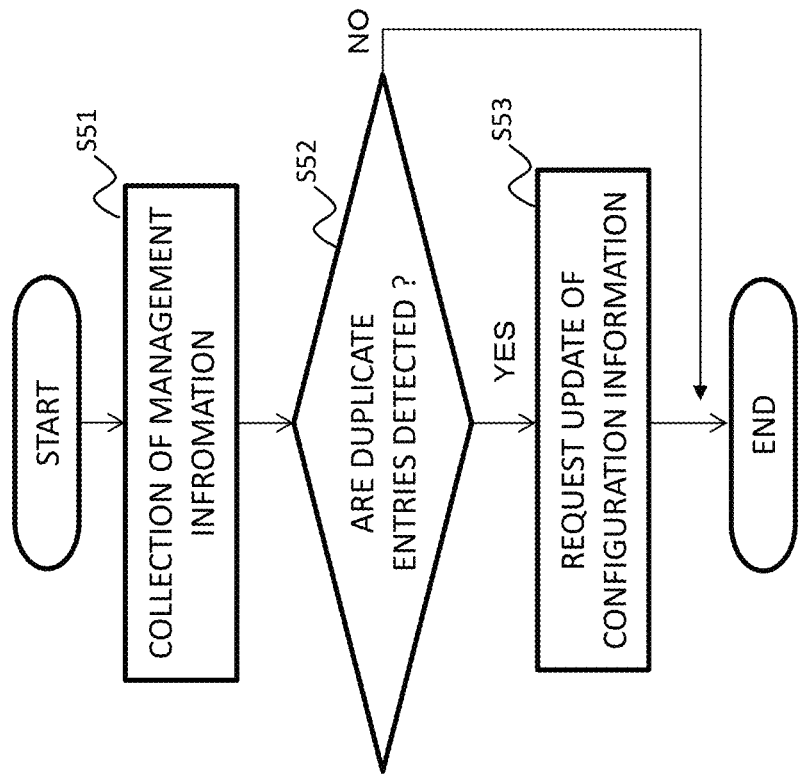
FIG. 12 is a flowchart showing an example of flow of processes executed by the virtual machine management apparatus 100.

In the description below, referring to FIG. 12, flow of processes executed by the virtual machine management apparatus 100 will be concretely explained. The configuration information collection part 121 periodically collects the virtual machine configuration information, the physical machine ID, and the virtual machine information from the physical machine 201 and store them in the management table 111 (step S51). At that time, the management table 111 becomes a state, for example, illustrated in FIG. 10.

The determination part 122 determines whether or not multiple virtual machine information corresponding to the same virtual machine configuration information is present. In other words, the determination part 122 determines whether or not entries having duplicate virtual machine configuration information are detected (step S52). Herein, in a case where any duplicate entries are not detected (step S52, NO), the determination part 122 terminates its processing.

On the other hand, in a case where the determination part 122 determines that multiple virtual machine information corresponding to the same virtual machine configuration information is present (step S52, YES), the change request part 123 requests the physical machine 201 to change the virtual machine configuration information (step S53). For example, in the example illustrated in FIG. 10, the change request part 123 requests the configuration information changing parts 333 of the virtual machines X1, X4 to change the virtual machine configuration information.

As stated above, according to the second exemplary embodiment, duplication of the virtual machine configuration information can be eliminated even in a case where the virtual machine is cloned on the same physical machine 201.

Other Exemplary Embodiments

In the first exemplary embodiment, explained is a case where duplication of virtual machine configuration information is detected by way of determining whether or not the physical machines IDs are identical. However, likewise the second exemplary embodiment, duplication of virtual machine configuration information may be detected by way of determining whether or not the virtual machine information is identical. For example, it is assumed that the virtual machine X1 (virtual machine information: 1) of the physical machine 201 is cloned as a virtual machine Y2 (virtual machine information: 2) in the physical machine 202. Under such situation, duplication of the virtual machine configuration information may be detected if the virtual machine information of the virtual machine X1 is different from the virtual machine information of the virtual machine Y2.

In the first and second exemplary embodiments, the virtual machine management apparatus 100 comprises the configuration information collection part 121, the determination part 122 and the change request part 123. However, these function parts may be configured as individual apparatuses.

In the first and second exemplary embodiments, the configuration information changing part 333 of the physical machine 201 generates the new virtual machine configuration information. However, the change request part 123 of the virtual machine management apparatus 100 may generate the new virtual machine configuration information and transmits it to the configuration information changing part 333.

In the first and second exemplary embodiments, the processing part 330 is configured on each virtual machine. However, the processing part 330 may be realized as a supervisory function part on the physical machines 201, 202 for managing each virtual machine. That is, the processing part 330 may be configured as a software on the virtual machine or realized as a hardware on the physical machines 201, 202.

A part or the entire of the above exemplary embodiments may be described as the following modes, but not limited thereto.

(Mode 1)

A management apparatus, comprising:
   a management table that stores virtual machine configuration information indicating configuration of virtual machines, and, in association therewith, physical machine ID(s) for identifying physical machine(s) operating the virtual machine(s);
   a configuration information collection part that collects, from the physical machines, the virtual machine configuration information of the virtual machines which are operated by the physical machine(s) and, in association therewith, the physical machine ID(s) of the physical machine(s);
   a determination part that detects a physical machine ID corresponding to the virtual machine configuration information collected by the configuration information collection part among information stored in the management table, and determines whether or not the detected physical machine ID matches with the physical machine ID(s) collected by the configuration information collection part; and
   a change request part that, in a case where it is determined as not matching by the determination part, requests the physical machine of a source of the information collected by the configuration information collection part to change the virtual machine configuration information.

(Mode 2)

The management apparatus according to Mode 1, wherein
   the management table stores virtual machine information managed by the physical machine for identifying the virtual machine(s) in association with the virtual machine configuration information and the physical machine ID(s);
   the configuration information collection part collects the virtual machine information in association with the virtual machine configuration information and the physical machine ID(s) and store them in the management table;
   the determination part determines whether or not multiple virtual machine information corresponding to the same virtual machine configuration information is present in information stored in the management table,
   the change request part requests the physical machine to change the virtual machine configuration information, in a case where the determination part determines that multiple virtual machine information corresponding to the same virtual machine configuration information is present.

(Mode 3)

The management apparatus according to Mode 1 or 2, wherein the virtual machine configuration information is information including IP address, MAC address, and virtual machine name.

(Mode 4)

The management apparatus according to Mode 2, wherein the virtual machine information is information assigned when the virtual machine(s) is (are) created.

(Mode 5)

The management apparatus according to any one of Modes 1 to 4, wherein the change request part generates a new virtual machine configuration information and transmits it to the physical machine of the source of the information collected by the configuration information collection part so as to request the source physical machine to change the virtual machine configuration information.

(Mode 6)

A management system comprising physical machines operating virtual machines and a management apparatus managing the virtual machines, wherein the management apparatus comprises:

a management table that stores virtual machine configuration information indicating configuration of virtual machine(s), and, in association therewith, physical machine ID(s) for identifying physical machine(s) operating the virtual machine(s);

a configuration information collection part that collects, from the physical machines, the virtual machine configuration information of the virtual machine(s) which is (are) operated by the physical machine(s) and, in association therewith, the physical machine ID(s) of the physical machine(s);

a determination part that detects a physical machine ID corresponding to the virtual machine configuration information collected by the configuration information collection part among information stored in the management table, and determines whether or not the detected physical machine ID matches with the physical machine ID collected by the configuration information collection part; and a change request part that, in a case where it is determined as not matching by the determination part, requests the physical machine of a source of the information collected by the configuration information collection part to change the virtual machine configuration information.

(Mode 7)

The management system according to Mode 6, wherein a configuration information changing part is configured in the virtual machine(s), which generates, and changes to, a new virtual machine(s) configuration information in a case where the virtual machine receives a request to change the virtual machine configuration information from the management apparatus.

(Mode 8)

The management system according to Mode 6, wherein the physical machine comprises a configuration information changing part that generates, and changes to, a new virtual machine configuration information in a case where the physical machine receives a request to change the virtual machine configuration information from the management apparatus.

(Mode 9)

A management method, comprising:

a configuration information collection step of collecting virtual machine configuration information of virtual machines which are operated by physical machine(s) and, in association therewith, physical machine ID(s) of the physical machine(s), from the physical machine(s);

a determination step of detecting, among information stored in a management table that stores the virtual machine configuration information indicating configuration of the virtual machine(s) and, in association therewith, the physical machine ID(s) for identifying the physical machine(s) operating the virtual machine(s), a physical machine ID corresponding to the virtual machine configuration information collected in the configuration information collection step, and determining whether or not the detected physical machine ID matches with the physical machine ID(s) collected in the configuration information collection step; and a change request step of requesting, in a case where it is determined as not matching in the determination step, the physical machine of a source of the information collected in the configuration information collection step, to change the virtual machine configuration information.

(Mode 10)

A management program causing a computer to execute:

a configuration information collection process of collecting virtual machine configuration information of virtual machines which are operated by physical machine(s), and, in association therewith, physical machine ID(s) of the physical machine(s), from the physical machine(s);

a determination process of detecting, among information stored in a management table that stores the virtual machine configuration information indicating configuration of the virtual machine(s) and, in association therewith, the physical machine ID(s) for identifying the physical machine(s) operating the virtual machine(s), a physical machine ID corresponding to the virtual machine configuration information collected in the configuration information collection process, and determining whether or not the detected physical machine ID matches with the physical machine ID(s) collected in the configuration information collection process; and a change request process of requesting, in a case where it is determined as not matching in the determination process, the physical machine of a source of the information collected in the configuration information collection process, to change the virtual machine configuration information.

Disclosure of the above Patent Literature is incorporated herein by reference thereto, Modifications and adjustments of the exemplary embodiments and examples are possible within the ambit of the disclosure (including the claims) of the present invention. Various combinations and selections (including non-selections) of various disclosed elements (including the elements in the claims, exemplary embodiments, examples, drawings, etc.) are possible within the ambit of the disclosure of the present invention. Namely, the present invention of course includes various variations and modifications that could be made by those skilled in the art according to the overall disclosure including the claims and the technical concept.

REFERENCE SIGNS LIST 100 virtual machine management apparatus
110 storage part 111 management table
120 processing part
121 configuration information collection part
122 determination part
123 change request part
130 transmission/reception part
201, 202 physical machine
210 storage part
220 processing part
230 virtual machine storing region
240 transmission/reception part
310 HDD
320 CPU
330 processing part
331 configuration table
332 configuration information response part
333 configuration information changing part
340 transmission/reception part

What is claimed is:

1. A management apparatus comprising:
at least a processor; and
a memory in circuit communication with the processor, wherein the memory stores
a management table that stores, for each of a plurality of first virtual machines operated by a first physical machine having a first physical machine ID, first virtual machine configuration information of the first virtual machine, and in association therewith, the first physical machine ID of the first physical machine operating the first virtual machines, and
wherein the processor is configured to execute program instructions stored in the memory to implement:
collecting, from a second physical machine having a second physical machine ID, second virtual machine configuration information of a second virtual machine operated by the second physical machine and in association therewith, the second physical machine ID of the physical second machine operating the second virtual machine;
identifying, the first virtual machine configuration information stored in the management table that matches the second virtual machine configuration information that has been collected from the second physical machine;
determining whether or not the first physical machine ID within the first virtual machine configuration information that has been identified matches the second physical machine ID that has been collected; and
in a case in which the first physical machine ID within the first virtual machine configuration information that has been identified does not match the second physical machine ID that has been collected, requesting the second physical machine to change the second virtual machine configuration information of the second virtual machine operated by the second physical machine.

2. The management apparatus according to claim 1, wherein
the processor is configured to execute the program instructions stored in the memory to further implement storing, in the management table, the second virtual machine configuration information of the second virtual machine, and in association therewith, the second physical machine ID of the second physical machine operating the second virtual machine, as an additional first virtual machine configuration information of an additional first virtual machine, and in association therewith, an additional physical machine ID of an additional first physical machine operating the additional first virtual machine,
the determining comprises determining whether or not multiple of the first virtual machine configuration information stored in the management table are the same, and
the requesting comprises requesting the second physical machine to change the second virtual machine configuration information, in a case where the determining determines that multiple of the first virtual machine information stored in the management table are the same.

3. The management apparatus according to claim 1, wherein
the second virtual machine configuration information of the second virtual machine and the first virtual machine configuration information of the first virtual machine includes an IP address, a MAC address, and a virtual machine name.

4. The management apparatus according to claim 1, wherein
the second virtual machine configuration information is assigned when the second virtual machine is created, and the first virtual machine configuration information of the first virtual machine is assigned when the first virtual machine is created.

5. The management apparatus according to claim 1, wherein
the requesting comprises generating new virtual machine configuration information and transmitting the new virtual machine configuration information to the second physical machine to request the second physical machine to change the second virtual machine configuration information to the new virtual machine configuration information.

6. A management system comprising:
a plurality of first physical machine having a first physical machine ID and operating a plurality of first virtual machines;
a second physical machine having a second physical machine ID and operating a second virtual machine; and
a management apparatus managing the first virtual machines and the second virtual machine, wherein
the management apparatus comprises:
at least a processor; and
a memory in circuit communication with the processor, wherein the memory stores
a management table that stores, for the first virtual machine, first virtual machine configuration information of the first virtual machine, and in association therewith, the first physical machine ID of the first physical machine operating the first virtual machines, and
wherein the processor is configured to execute program instructions stored in the memory to implement:
collecting, from the second physical machine, second virtual machine configuration information of the second virtual machine operated by the second physical machine and in association therewith, the second physical machine ID of the physical second machine operating the second virtual machine;
identifying, the first virtual machine configuration information stored in the management table that matches the second virtual machine configuration information that has been collected from the second physical machine;

determining whether or not the first physical machine ID within the first virtual machine configuration information that has been identified matches the second physical machine ID that has been collected; and in a case in which the first physical machine ID within the first virtual machine configuration information that has been identified does not match the second physical machine ID that has been collected, requesting the second physical machine to change the second virtual machine configuration information of the second virtual machine operated by the second physical machine.

7. The management system according to claim 6, wherein the second virtual machine generates new virtual machine configuration information and changes the second virtual machine configuration information to the new virtual machine configuration information in a case where the second virtual machine receives a request to change the second virtual machine configuration information from the management apparatus.

8. The management system according to claim 6, wherein the second physical machine generates a new virtual machine configuration information and changes the second virtual machine configuration information to the new virtual machine configuration information in a case where the second physical machine receives a request to change the second virtual machine configuration information from the management apparatus.

9. A management method performed by a management apparatus and comprising:

storing a management table that stores, for each of a plurality of first virtual machines operated by a first physical machine having a first physical machine ID, first virtual machine configuration information of the first virtual machine, and in association therewith, the first physical machine ID of the first physical machine operating the first virtual machines;

collecting, from a second physical machine having a second physical machine ID, second virtual machine configuration information of a second virtual machine operated by the second physical machine and in association therewith, the second physical machine ID of the physical second machine operating the second virtual machine;

identifying, the first virtual machine configuration information stored in the management table that matches the second virtual machine configuration information that has been collected from the second physical machine;

determining whether or not the first physical machine ID within the first virtual machine configuration information that has been identified matches the second physical machine ID that has been collected; and in a case in which the first physical machine ID within the first virtual machine configuration information that has been identified does not match the second physical machine ID that has been collected, requesting the second physical machine to change the second virtual machine configuration information of the second virtual machine operated by the second physical machine.

10. A non-transitory computer-readable storage medium storing a management program executable by a computer to execute:

storing a management table that stores, for each of a plurality of first virtual machines operated by a first physical machine having a first physical machine ID, first virtual machine configuration information of the first virtual machine, and in association therewith, the first physical machine ID of the first physical machine operating the first virtual machines;

collecting, from a second physical machine having a second physical machine ID, second virtual machine configuration information of a second virtual machine operated by the second physical machine and in association therewith, the second physical machine ID of the physical second machine operating the second virtual machine;

identifying, the first virtual machine configuration information stored in the management table that matches the second virtual machine configuration information that has been collected from the second physical machine;

determining whether or not the first physical machine ID within the first virtual machine configuration information that has been identified matches the second physical machine ID that has been collected; and in a case in which the first physical machine ID within the first virtual machine configuration information that has been identified does not match the second physical machine ID that has been collected, requesting the second physical machine to change the second virtual machine configuration information of the second virtual machine operated by the second physical machine.

11. The management system according to claim 6, wherein the processor is configured to execute the program instructions stored in the memory to further implement storing, in the management table, the second virtual machine configuration information of the second virtual machine, and in association therewith, the second physical machine ID of the second physical machine operating the second virtual machine, as an additional first virtual machine configuration information of an additional first virtual machine, and in association therewith, an additional physical machine ID of an additional first physical machine operating the additional first virtual machine, the determining comprises determining whether or not multiple of the first virtual machine configuration information stored in the management table are the same, and the requesting comprises requesting the second physical machine to change the second virtual machine configuration information, in a case where the determining determines that multiple of the first virtual machine information stored in the management table are the same.

12. The management system according to claim 6, wherein the second virtual machine configuration information of the second virtual machine and the first virtual machine configuration information of the first virtual machine includes an IP address, a MAC address, and a virtual machine name.

13. The management system according to claim 6, wherein the second virtual machine configuration information is assigned when the second virtual machine is created, and the first virtual machine configuration information of the first virtual machine is assigned when the first virtual machine is created.

14. The management method according to claim 9, further comprising storing, in the management table, the second virtual machine configuration information of the second virtual machine, and in association therewith, the second physical machine ID of the second physical machine operating the second virtual machine, as an additional first virtual machine configuration information of an additional first virtual machine, and in association therewith, an additional physical machine ID of an additional first physical machine operating the additional first virtual machine, wherein the determining comprises determining whether or not multiple of the first virtual machine configuration information stored in the management table are the same, and the requesting comprises requesting the second physical machine to change the second virtual machine configuration information, in a case where the determining determines that multiple of the first virtual machine information stored in the management table are the same.

15. The management method according to claim 9, wherein the second virtual machine configuration information of the second virtual machine and the first virtual machine configuration information of the first virtual machine includes an IP address, a MAC address, and a virtual machine name.

16. The management method according to claim 9, wherein the second virtual machine configuration information is assigned when the second virtual machine is created, and the first virtual machine configuration information of the first virtual machine is assigned when the first virtual machine is created.

17. The management method according to claim 9, wherein the requesting comprises generating new virtual machine configuration information and transmitting the new virtual machine configuration information to the second physical machine to request the second physical machine to change the second virtual machine configuration information to the new virtual machine configuration information.

18. The non-transitory computer-readable storage medium according to claim 10, wherein the management program is executable by the computer to further execute:

storing, in the management table, the second virtual machine configuration information of the second virtual machine, and in association therewith, the second physical machine ID of the second physical machine operating the second virtual machine, as an additional first virtual machine configuration information of an additional first virtual machine, and in association therewith, an additional physical machine ID of an additional first physical machine operating the additional first virtual machine, wherein the determining comprises determining whether or not multiple of the first virtual machine configuration information stored in the management table are the same, and the requesting comprises requesting the second physical machine to change the second virtual machine configuration information, in a case where the determining determines that multiple of the first virtual machine information stored in the management table are the same.

19. The non-transitory computer-readable storage medium according to claim 10, wherein the second virtual machine configuration information of the second virtual machine and the first virtual machine configuration information of the first virtual machine includes an IP address, a MAC address, and a virtual machine name.

20. The non-transitory computer-readable storage medium according to claim 10, wherein the second virtual machine configuration information is assigned when the second virtual machine is created, and the first virtual machine configuration information of the first virtual machine is assigned when the first virtual machine is created.

* * * * *